May 6, 1941.  M. F. A. JULIEN  2,241,138
RESILIENT SUPPORT
Filed Nov. 21, 1936
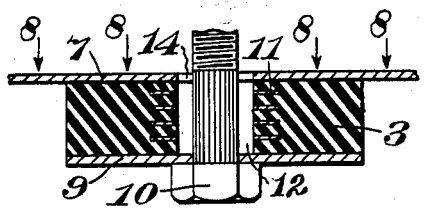
M. F. A. Julien
INVENTOR
By Glascock Downing &Seebold
(Attys.)

Patented May 6, 1941

2,241,138

UNITED STATES PATENT OFFICE 2,241,138

RESILIENT SUPPORT

Maurice François Alexandre Julien, Paris, France

Application November 21, 1936, Serial No. 112,183
In France May 15, 1936

2 Claims. (Cl. 248—358)

The present invention relates to supports of resilient material which are capable of providing a rigidity or stiffness regulated in certain directions.

The supports of resilient material, and more particularly those in which the material adheres to metal members such as frames or the like which are attached to the article to be supported, such as internal combustion engines have in general well defined resiliences in different directions but such are not capable of obtaining or providing different elasticities in certain directions that are necessary. In the various applications or uses of these resilient supports it is necessary to have a very great or very small elasticity in quite a definite direction, as compared with the natural elasticity of the resilient material.

The present invention is characterised by means involving a certain lamination or interleaving of the elastic mass, the leaves being arranged in a suitable manner, so as to obtain the various values desired for the elasticity of the supports in the desired directions.

In the case in which a great rigidity of the support is required in certain directions the expansion or the contraction of the elastic mass is controlled in this direction by constraining it to remain adherent to certain metallic surfaces dividing the mass into leaves or laminations. The leaves are embedded in the mass of resilient material and are flat without any appreciable thickness. The elastic sheets have no connection with the framework or with the object to be supported otherwise than through the medium of the elastic mass.

Further features and objects of the invention will be apparent from a consideration of the annexed drawing and the following description wherein an exemplary embodiment of the invention is disclosed.

In the drawing the arrangement according to the invention is illustrated in section.

Referring to the drawing there is shown at 7 a plate which may be attached to a frame at the points 8 well distributed over its surface, while the plate 9 is connected to a vibrating member, as in a motor for example, through the medium of a bolt 10. A rubber block or layer of resilient material 3 is arranged between the plates 7 and 9 and the rubber block is secured to the faces of these plates. The rubber block is provided with an opening 12 through which the bolt 10 extends. The opening 12 is larger than the bolt so that an annular space is provided around the bolt to permit relative movements of the resilient layer with respect to the bolt. The plate 7 is also provided with an opening 14 for the passage of the bolt 10. The bolt 10 obviously localises the fatigue at the edges of the central hole in the support. If it is desired to have weak lateral displacements of the motor in relation to the frame, and at the same time a great rigidity in the direction of the axis of the bolt, relatively thin plates 11 may be adopted, which are arranged around the hole through which the bolt 10 passes.

The resilient layer or rubber block 3 is thus divided into layers in the immediate vicinity of the opening 12 by the embedded plates 11. Thus relatively great lateral displacements of the bolt 10 are possible while the support provides considerable rigidity in the direction of the axis of the bolt.

I claim:

1. A resilient mounting for a vibrating member so as to be capable of relatively great lateral displacements and relatively small displacements in a plane substantially at right angles to the lateral displacements comprising in combination two supporting plates arranged parallel to one another, a layer of resilient material connecting said plates, one of said plates being fixed to a frame and having an opening therein and the resilient material having an opening therein, means passing through said openings for connecting the other of said plates to the vibrating member, and relatively thin plates embedded in the resilient material in the region of the opening only permitting freedom of movement in directions parallel to said plates.

2. A resilient mounting for a vibrating member capable of relatively great lateral displacements and relatively small displacements in a plane substantially at right angles to the lateral displacements comprising in combination, two supporting plates arranged substantially parallel to one another, a rubber block connecting faces of said plates, one of said plates being adapted to be fixed to a frame and having an opening therein and the rubber block having an opening therein, a bolt passing through said openings for connecting the other plate to a vibrating member, and relatively thin substantially parallel plates arranged in the rubber block in the vicinity of the opening only permitting freedom of movement of the rubber block in directions parallel to said plates.

MAURICE FRANÇOIS
ALEXANDRE JULIEN.